United States Patent
Bragin et al.

(10) Patent No.: US 10,069,273 B1
(45) Date of Patent: Sep. 4, 2018

(54) LASING-GAS MIXTURE FOR EXCIMER LASER

(71) Applicant: COHERENT LASERSYSTEMS GMBH & CO. KG, Göttingen (DE)

(72) Inventors: Igor Bragin, Göttingen (DE); Oleg Melnikov, Göttingen (DE); Timur Misyuryaev, Göttingen (DE)

(73) Assignee: COHERENT LASERSYSTEMS GMBH & CO. KG, Göttingen (DE)

( * ) Notice: Subject to any disclaimer, the term of this patent is extended or adjusted under 35 U.S.C. 154(b) by 0 days.

(21) Appl. No.: 15/448,023

(22) Filed: Mar. 2, 2017

(51) Int. Cl.
- H01S 3/225 (2006.01)
- H01S 3/032 (2006.01)
- H01S 3/097 (2006.01)

(52) U.S. Cl.
CPC ............ H01S 3/225 (2013.01); H01S 3/032 (2013.01); H01S 3/097 (2013.01)

(58) Field of Classification Search
CPC ........ H01S 3/225; H01S 3/2253; H01S 3/097; H01S 3/2207
See application file for complete search history.

(56) References Cited

U.S. PATENT DOCUMENTS

| | | | |
|---|---|---|---|
| 4,340,968 A * | 7/1982 | Willis | H01S 3/225 372/57 |
| 4,841,537 A | 6/1989 | Alexandrov et al. | |
| 5,307,364 A * | 4/1994 | Turner | H01S 3/225 372/55 |
| 6,286,941 B1 * | 9/2001 | Courian | B41J 2/1404 347/65 |
| 6,998,620 B2 | 2/2006 | Schriever | |
| 7,408,714 B2 | 8/2008 | Windpassinger et al. | |
| 8,238,400 B2 | 8/2012 | Targsdorf et al. | |
| 9,335,276 B2 | 5/2016 | Van Der Wilt | |
| 2003/0058429 A1 | 3/2003 | Schriever | |
| 2013/0341310 A1 | 12/2013 | Van Der Wilt | |

OTHER PUBLICATIONS

Adkhamov et al., "influence of hydrogen on the characteristics of an excimer XeCl laser", Jan. 1988, Sov. J. Quantum Electron. , 18(1), p. 72-73.*
Rudko, "High-repetition-rate, recirculating hydrogen fluoride/deuterium fluoride laser," 1982, Review of Scientific Instruments, 53, pp. 452-457.*
McKee et al., "Lifetime Extension of XeCl and KrCl Lasers with Additives", Appl Physics Letters, vol. 36, No. 12, Jun. 15, 1980, pp. 943-945.
International Search Report and Written Opinion received for PCT Patent Application No. PCT/EP2018/054370, dated Jun. 11, 2018, 11 pages.

* cited by examiner

Primary Examiner — Michael Carter
(74) Attorney, Agent, or Firm — Morrison & Foerster LLP

(57) ABSTRACT

A xenon chloride (XeCl) excimer laser includes a lasing-gas mixture including a buffer gas, a noble gas, a halogen-donating gas, and deuterium. The deuterium is present in a concentration greater than about 10 parts-per-million.

12 Claims, 3 Drawing Sheets

LASING-GAS MIXTURE FOR EXCIMER LASER

TECHNICAL FIELD OF THE INVENTION

The present invention relates in general to gas-discharge lasers. The invention relates in particular to lasing-gas mixtures for excimer gas-discharge lasers

DISCUSSION OF BACKGROUND ART

Excimer lasers have a capability to generate laser-radiation having a fundamental wavelength in the ultraviolet (UV) region of the electromagnetic spectrum. Operation of excimer lasers is based on an optical transition between different electronically excited states of noble-gas molecules. Such molecules exist only in an electronically excited state and accordingly are generally referred to as "excimers". The noble-gas halide molecules are created in the excited state by a short and powerful electrical excitation (gas discharge) of between about 1 nanosecond (ns) and 1000 ns duration. Relaxation of the excited molecules to the ground state results in the emission of high-intensity UV light in a laser-resonator, which delivers the UV light as laser-radiation.

An excimer laser uses as an active medium (lasing gas) a noble gas, typically argon (Ar), krypton (Kr), or xenon (Xe), and a halogen-donating gas, typically hydrogen chloride (HCl) or fluorine ($F_2$). These excimer forming gases are low concentration additives in a neutral buffer gas, typically neon (Ne) or helium (He). The buffer gas must be at a relatively high pressure, for example between about 2 atmospheres pressure (Bar) and about 10 Bar, in order to provide a desired impedance matching of the electrical gas discharge and adequate laser efficiency. The specific noble-gas and halogen-donating gas determine the wavelength of the laser-radiation.

The most powerful state-of-the-art industrial excimer lasers are based on xenon chloride (XeCl) molecules and generate laser-radiation having a wavelength of 308 nanometers (nm). Such excimer lasers can provide 308 nm laser-radiation pulses having a pulse-energy of about 1000 millijoules (mJ) at a pulse-repetition frequency (PRF) of about 600 Hertz (Hz). Such a laser is able to operate continuously over 100 million pulses while maintaining very high stability of pulse-energy and temporal and spatial optical parameters.

In laser-processes requiring greater pulse energy, the output of two or more such lasers can be combined by suitable beam-mixing optics and appropriate synchronization of pulse delivery. Such beam-mixing and synchronization are described in U.S. Pat. No. 7,408,714 and U.S. Pat. No. 8,238,400, respectively, each thereof assigned to the assignee of the present invention, and the complete disclosure of each of which is hereby incorporated herein by reference.

The duration of continuous operation of the laser is limited by degradation of the lasing gas and of some components of the laser, especially windows in a chamber containing the lasing gas and excitation (discharge) electrodes. Performance degradation can eventually develop due to chemical and electrical erosion of the discharge electrodes and other surfaces in the highly-reactive halogen-containing atmosphere in the chamber. Such erosion leads to contamination of the lasing gas and the laser chamber windows. As a result, interruptions of the laser operation are periodically needed to exchange the lasing gas and to service the laser windows.

The lasing-gas mixture typically used in such a laser consists primarily of Ne as the buffer gas at elevated pressure (for example about 6 Bar), with small additions of Xe (about 1%) and HCl (about 0.1%). Composition of the lasing-gas mixture is optimized in a way that allows an acceptable compromise between laser-efficiency and the other laser parameters.

Small additions of hydrogen, for example between about 10 and about 2000 parts-per-million (ppm), are commonly used to help stabilize excimer laser performance. Such small additions can significantly extend the lifetime of the lasing gas. However, an increase of the hydrogen concentration above an optimal concentration leads to a degradation of the laser performance and reduction of the laser output energy. A compromise between the lasing-gas lifetime and the output pulse-energy and stability determines the optimal concentration of hydrogen. This can depend on desired output parameters and other features of a particular laser.

One unfortunate characteristic of laser-radiation pulses delivered by an excimer laser is that each pulse is characterized by a first portion having a certain amplitude followed by a second portion having about half the amplitude of the first portion with a minimum amplitude between the first and second portions of the pulse. This is illustrated in FIG. 1, which is a graph schematically illustrating pulse amplitude as a function of time for a 308 nm XeCl excimer laser having a lasing-gas mixture composition as discussed above. It can be seen that the first portion of the pulse (portion A) has an amplitude more than twice that of the second portion of the pulse (portion B).

This characteristic, while relatively benign for certain laser-processing operations, such a cutting or ablation of materials, can be problematical for processes that depend more critically on the temporal characteristics of pulse energy delivery. One particular such process is excimer-laser recrystallization of silicon, which is a process used extensively in the manufacture of flat panels for large-screen displays. In this process, there is a particular energy density-per-pulse, generally referred to as the optimum energy density (OED) that produces, from an amorphous silicon layer, a poly-crystalline layer having a relatively uniform grain structure and having a minimum of defects that could adversely affect production yields of usable flat panels.

Problems of the above discussed two-portion pulse delivery have been substantially minimized by relatively recent developments in-situ, i.e., on a production line, monitoring of the recrystallizing process which can be arranged to adjust pulse-energy at least manually, responsive to optical characterization of flat panels being recrystallized. Such a monitoring process and characterization of the silicon recrystallization itself are described in detail in U.S. Pat. No. 9,335,276, and U.S Pub. No. 2013/0341310, both assigned to the assignee of the present invention, and with the complete disclosures therein are hereby incorporated herein by reference. It is believed, however, that improvements in the sensitivity and effectiveness of these processes may be possible if a means could be found to reduce the difference between the above-described first and second portions of excimer laser pulses.

SUMMARY OF THE INVENTION

In one aspect of the present invention, a noble-gas halide excimer laser, comprises a laser-housing containing discharge electrodes and a lasing-gas mixture. The lasing gas mixture includes a buffer gas, a noble gas, a halogen-donating gas, and deuterium. The deuterium is present in a concentration greater than about 10 parts-per-million.

The deuterium may be present as an additive to the buffer gas, the noble gas, and the halogen-donating gas or may be donated by the halogen-donating gas.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

A reduction in amplitude difference between first and second portions of excimer laser pulses is achieved by replacing the hydrogen additive of prior-art excimer lasing gases with deuterium ($D_2$). Deuterium is the closest isotope of hydrogen, but has slightly different chemical and electrical properties.

The addition of deuterium instead of hydrogen into the excimer lasing gas provided improvement of the lasing-gas lifetime similar to that discussed above. However, an optimal concentration of deuterium was found to be half the optimal concentration of hydrogen. The total energy-per-pulse was found to be the same as that achieved with the prior-art hydrogen additive. The pulse-to-pulse and long-term pulse-energy stability was similar to that achieved with the hydrogen additive. The deuterium additive in this optimal concentration for lifetime and stability, noticeably and reproducibly reduced the above-discussed amplitude difference between the first and second portions of the XeCl laser output pulses.

Figure 1:
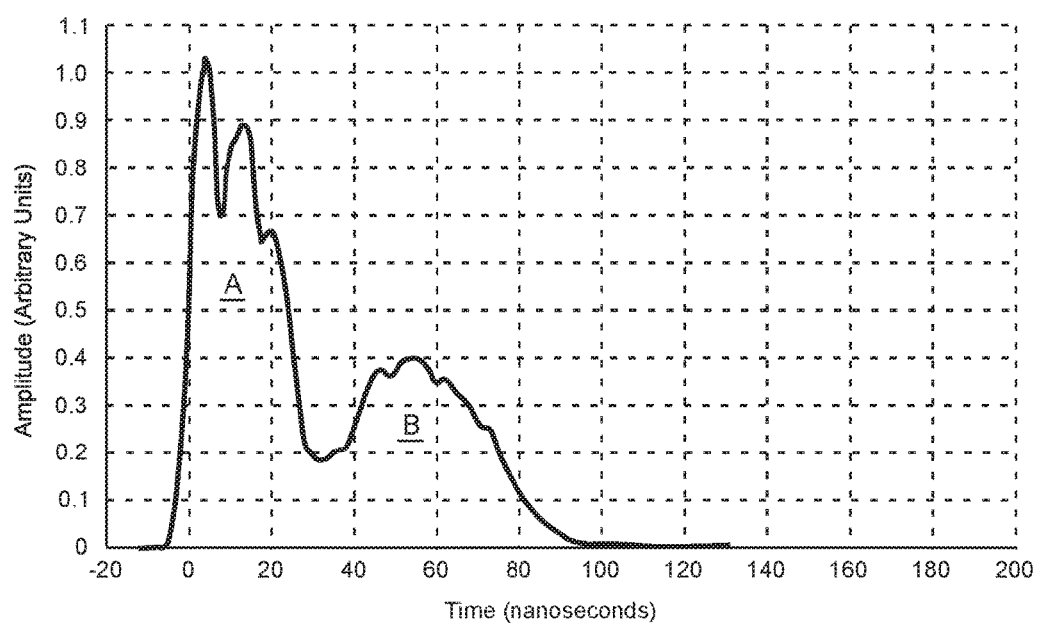
FIG. 1 is a graph schematically illustrating amplitude as a function of time for a pulse delivered by a prior-art XeCl excimer laser having a lasing gas including a hydrogen additive for extending the lifetime of the lasing gas.
Figure 2:
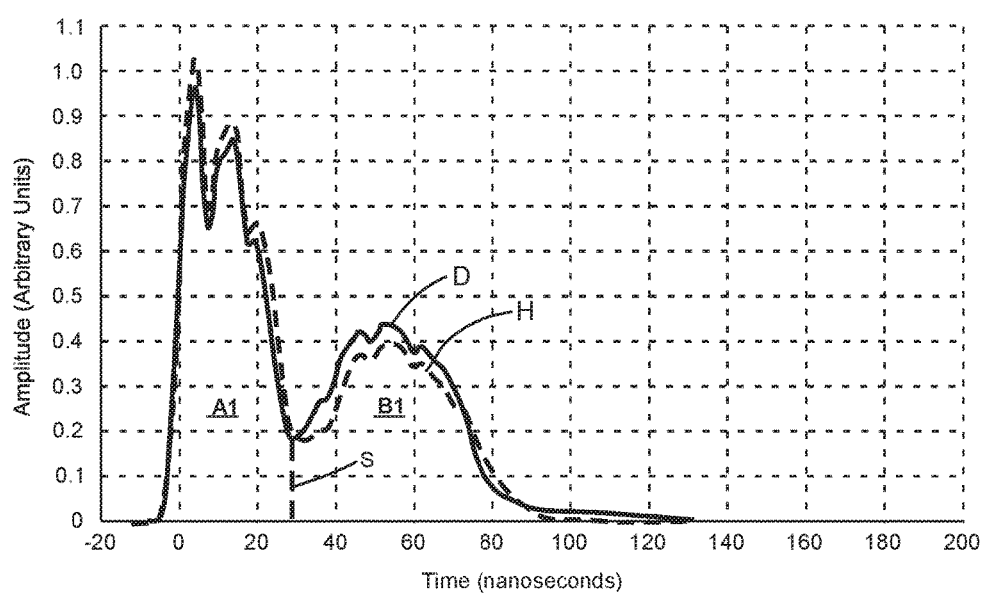
FIG. 2 is a graph schematically illustrating amplitude as a function of time for a pulse delivered by a XeCl excimer laser, similar to the laser of FIG. 1, but wherein the hydrogen additive is replaced by a deuterium additive.

FIG. 2 is a graph (solid curve D) schematically illustrating amplitude as a function of time for a pulse delivered by a XeCl excimer laser similar to the laser of FIG. 1, but wherein the hydrogen additive is replaced by a deuterium additive. Dashed curve H depicts the prior-art pulse of FIG. 1, on the same scale for comparison.

It can be seen from a comparison of curves D and H, that the amplitude of the first portion (A1) of the pulse of curve D is lower than that of prior-art curve H by about 5%. The amplitude of the second portion (B1) of curve D is higher than that of curve H by about 10%. In addition, the temporal width at half-maximum (TWHM) of the first portion of the pulse of curve D is about 5% less than that of the pulse of curve H, and the TWHM of the second portion of the pulse of curve D is about 10% greater than that of the second portion of the pulse of curve H.

These differences together amount to a significant reduction of the difference in energy between the first and second portions of the pulse of curve D compared with that of curve H. It is estimated that this reduction could be as much as 20%.

It should be noted here that the time between the falling edge of the first portion of the pulse of curve D and the rising edge of the second portion of the pulse of curve D is less than that of the pulse of curve H. This difference could be an advantage for a process in which conditions at the minimum between the first and second portions of a pulse were below a process threshold.

The above described results were obtained using a Model LAMBDA SX E500 XeCl excimer laser available from Coherent Laser Systems GmbH & Co. KG of Goettingen, Germany. The basic lasing-gas mixture for curves D and H of FIG. 2 included Ne as the buffer gas at a pressure of about 6 Bar; Xe at a concentration of about 1%; and HCl at a concentration of about 0.1%. The electrical excitation energy-per-pulse in each case was about 25 Joules-per-pulse. The hydrogen additive for prior-art curve H was at a concentration of 170 ppm. The deuterium additive for curve D was at a concentration of about 85 ppm.

A suitable concentration of deuterium for achieving the above described results is at least 10 ppm and preferably at least about 50 ppm. Some performance degradation may be encountered if the concentration exceeds 100 ppm.

Figure 3:
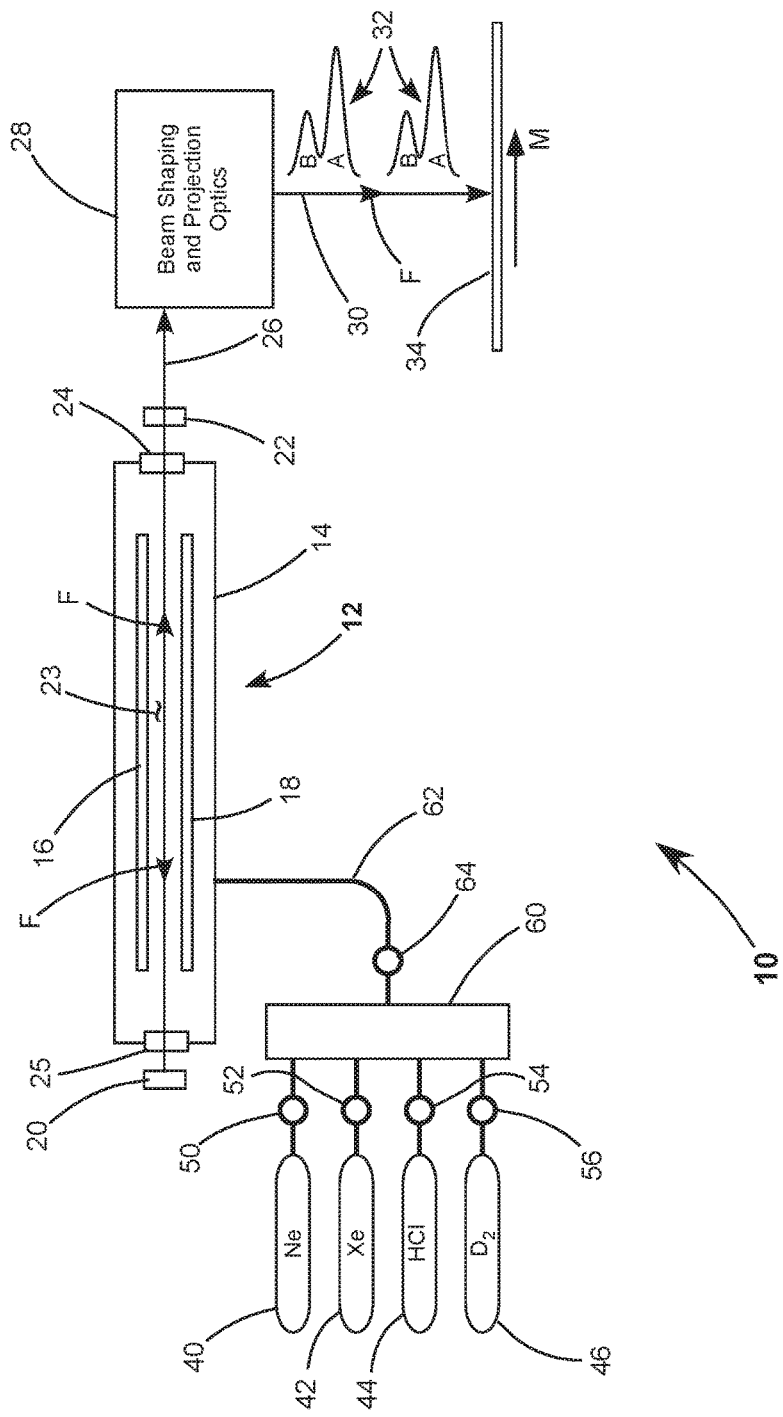
FIG. 3 schematically illustrates a preferred embodiment of laser processing apparatus in accordance with the present invention including an excimer laser having a housing supplied with lasing gas from sources of neon, xenon, hydrogen chloride and deuterium, the laser delivering a beam of laser pulses via beam-shaping and projection optics to a workpiece being processed.

FIG. 3 schematically illustrates a preferred embodiment 10 of laser processing apparatus in accordance with the present invention. Apparatus 10 includes an excimer laser 12 including an above-described inventive deuterium-containing lasing-gas mixture. Laser 12 includes a gas-tight housing 14 filled by the gas mixture. Located in housing 14 are discharge electrodes 16 and 18. Reflectors 20 and 22 form a laser-resonator 23 extending through the housing via windows 24 and 25 therein. Fundamental laser radiation circulates in resonator 23 as indicated by arrows F. A beam 26 of laser-radiation is delivered from the resonator via reflector 22, which is partially transparent to the laser-radiation.

Beam 26 is delivered to beam-shaping and projection optics 28 which reform beam 26 into a beam 30 having a cross-section and parameters appropriate to the laser processing operation. Beam 30, of course, is a beam of repeated laser pulses 32 (here, only two shown), with pulses having the above-described double-peak characteristic. Here it should be noted that as the pulses are depicted in space, first portion A of a pulse leads second portion B thereof in the projection direction. Pulses 32 are delivered to a workpiece 34 being processed. The workpiece may be translated relative to beam 30, as indicated by arrow M, dependent on the processing operation.

In this embodiment of laser-processing apparatus in accordance with the present invention, laser 12 is assumed to be a XeCl excimer laser with an inventive gas-mixture composition as described-above. Lasing-gas is supplied to housing 14 of laser 12 from cylinders 40, 42, 44, and 46, containing respectively neon, xenon, hydrogen chloride, and deuterium. Gases from the cylinders are mixed in a manifold 60, in proportions controlled by regulating-valves 50, 52, 54, and 56. Lasing-gas mixture from manifold 60 is delivered to housing 14 of laser 12 via a conduit 62, with delivery controlled by a regulating-valve 64.

It should be noted, here, that only sufficient description of apparatus is provided for understanding principles of the present invention. Basics of excimers lasers are well known in the art and a detailed description thereof is not necessary for understanding principles of the present invention, and accordingly is not present herein.

While the above-presented description of the present invention describes adding deuterium in elemental form to the lasing gas of an excimer laser, it is believed that the inventive deuterium addition could be accomplished by substituting a deuterium halide for a hydrogen halide as the halogen donating gas. For example, substituting deuterium chloride for hydrogen chloride. It is also believed that the advantageous results of the deuterium addition may be realized in the presence of some hydrogen additive. Further, while the present invention is described above with reference to results obtained with a XeCl excimer laser, it is anticipated that the advantageous results of the deuterium addition can be realized in other noble-gas-chloride excimer laser types, for example KrCl excimer lasers.

In summary, the present invention is described above with reference to a preferred and other embodiments. The invention is not limited, however, by the embodiments described herein. Rather, the invention is limited only by the claims appended hereto.

What is claimed is:

1. A noble-gas halide excimer laser, comprising:
   a laser-housing containing discharge electrodes and a lasing-gas mixture;
   the lasing gas mixture including a buffer gas, a noble gas, a halogen-donating gas, and deuterium; and
   wherein the deuterium is present in a concentration greater than about 10 parts-per-million.

2. The laser of claim 1, wherein the deuterium concentration is between about 50 parts-per-million and 100 parts-per-million.

3. The laser of claim 1, wherein the deuterium is present as an additive to the buffer gas, the noble gas, and the halogen-donating gas.

4. The laser of claim 1, wherein the deuterium is provided by the halogen-donating gas.

5. The laser of claim 1, wherein the buffer gas is neon, the noble gas is xenon, and the halogen-donating gas is hydrogen chloride.

6. The laser of claim 5, wherein the xenon composition is about 1% of the total, and the hydrogen chloride composition is about 0.1% of the total.

7. A method of laser-processing a work piece, comprising:
   generating laser-pulses from a noble-gas excimer laser, the laser having a lasing-gas mixture including a buffer gas, a noble gas, a halogen-donating gas, and deuterium in a concentration greater than about 10 parts-per-million; and
   delivering the laser-pulses to the workpiece.

8. The method of claim 7, wherein the deuterium concentration is between about 50 parts-per-million and 100 parts-per-million.

9. The method of claim 7, wherein the deuterium is present as an additive to the buffer gas, the noble gas, and the halogen-donating gas.

10. The method of claim 7, wherein the deuterium is provided by the halogen-donating gas.

11. The method of claim 7, wherein the buffer gas is neon, the noble gas is xenon, and the halogen-donating gas is hydrogen chloride.

12. The method of claim 11, wherein the xenon composition is about 1% of the total, and the hydrogen chloride composition is about 0.1% of the total.

* * * * *